Feb. 5, 1946.   J. MOOSS   2,394,250
EGG OPENING DEVICE
Filed Jan. 3, 1945
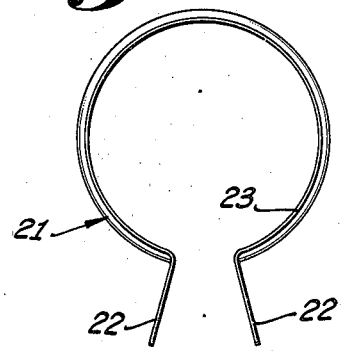
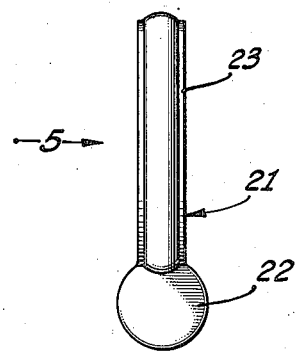
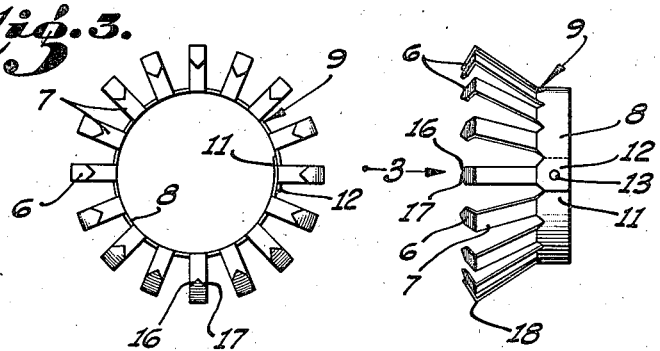
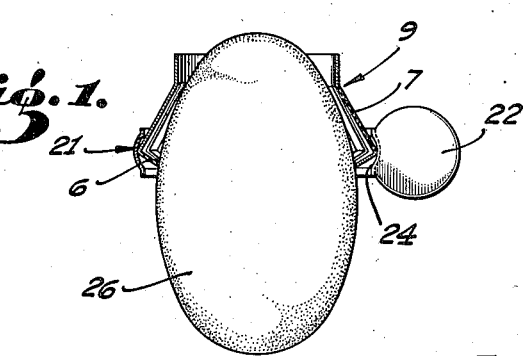
INVENTOR.
JOHN MOOSS,
BY
ATTORNEY.

Patented Feb. 5, 1946

2,394,250

UNITED STATES PATENT OFFICE 2,394,250

EGG OPENING DEVICE

John Mooss, Alhambra, Calif.

Application January 3, 1945, Serial No. 571,135

1 Claim. (Cl. 146—2)

This invention relates to kitchen and table articles, and has for an object the provision of a device for breaking the shell of an egg into two substantially equal sections and without shattering or cracking either of the halves thus separated from each other and thereby facilitating the operation of removing the shell's contents.

Another object is to provide an egg opening device as described which is operable with equal ease and efficiency in opening either raw or cooked eggs.

A further object of my present invention is to provide an egg opening device of the character described, which is of such simple, light and attractive design that it is adapted for use at the table as well as in the kitchen, and which is adapted for quantity production at low cost by a relatively simple die stamping process.

The invention possesses other objects and valuable features, some of which, with those enumerated, will be set forth in the following description of the preferred embodiment of my invention illustrated in the drawing accompanying and forming a part of the specification. It is to be understood that I do not limit myself to the showing made by said drawing and description but that I may adopt variations of the preferred form within the scope of my invention as defined by the claim.

Referring to the drawing:

Figure 1 is a transverse, vertical, medial sectional view of an egg opening device incorporating the principles of the present invention and showing the apparatus in operating position upon an egg.

Figure 2 is a view in side elevation of that portion of the device which carries the shell penetrating points.

Figure 3 is an end elevation, the direction of view being indicated by the arrow 3 of Figure 2.

Figure 4 is a side elevation of the actuating band which is manually operable to cause operation of the shell penetrating member.

Figure 5 is an end elevation, the direction of view being indicated by the arrow 5 of Figure 4.

In terms of broad inclusion, the egg opening device of the present invention comprises a plurality of shell penetrating points yieldably supported in a circular arrangement, the diameter of which is slightly less than the maximum transverse diameter of an average size hen's egg. Associated with the yieldably supported points is an actuating device whereby they all may simultaneously be forced radially inwards to penetrate the shell of an egg disposed within the circle described by the points, whereby the shell of the egg is broken and at points so closely adjacent each other that the shell will be broken along a line passing through those points of penetration, and into substantially equal sections, leaving the two halves of the egg shell substantially intact.

The shell penetrating points 6 are carried at the outer end of supporting arms 7, all of which are permanently and preferably integrally mounted upon a supporting annulus 8. This entire member 9 can conveniently be formed from a flat strip of resilient material such as steel, preferably of the stainless variety, or even of thin sheet plastic. However, if the device is to be made from plastic, manufacturing economy would probably require that the point carrying member 9 be cast in its final, arcuate form. However, when formed of flat sheet stock, a strip of suitable width is employed to accommodate both the annular portion 8 and the total combined length of the arms 7 and their respective penetrating points 6; and for greatest economy of manufacture, it is preferred that the spaces 9 between arms 7 at their bases, i. e., at their point of connection to the annulus 8, be equal to the width of the arms themselves, thus permitting two flat blanks to be struck from a width of sheet stock only slightly wider than that required for a single blank. After the flat blank has been struck from sheet stock as indicated, it is curled to annular form, bringing its two ends 11 and 12, respectively, into overlapping relation where they are permanently united as by a rivet or spot welding 13.

It is preferred that the several arms 7 be arranged in flaring position so that the circle described by their outer ends is of greater diameter than that of the annulus 8. This arrangement is advantageous from two standpoints, to wit, it reduces the length of strip stock necessary for the production of each of these members, and also yields a more pleasing design. The outer end of the arms 7 are deflected substantially radially inward; and the points 6 on the ends of these deflected portions are most easily provided by so forming the ends that they are defined by two oblique edges 16 and 17 which meet at an angle of not more than 90°, this formation of the points 6 being most easily accomplished as a portion of the operation of severing the flat blank from its parent strip of sheet stock.

Since the points 6 and the supporting arms 7 join each other in a relatively sharp angle 18, and since the angles 18 of the several arms 7 define the greatest circumference of this portion 9 of the egg opener, it is convenient to mount the actuating device 21 upon the point carrying member 9 in such a position that it encircles the angles 18 of the several arms 7. The actuator 21 comprises a band, which also conveniently can be formed from flat strip stock, but which is bent to circular form, or, to be more precise, to the form of an arc of slightly less than a full circle. A flange 22 extends substantially radially outward from each end of the arcuate portion 23 of the band 21 in position to be engaged by the finger and thumb and squeezed together, thus reducing the effective circumference of the band 23 and thereby flexing the point carrying arms 7 inwards and consequently forcing the points 6 inwards. It is preferred that the arcuate portion 21 of the band 23 be of arcuate form also in transverse section, as clearly shown in Figure 1, providing a concavity 24 on its inner circumferential surface within which the outermost or angular portions 18 of the arms are seated so as to releasably retain the band 21 in operative, assembled relation upon the point carrying member 9.

As hereinabove explained, the circle described by the several shell penetrating points 6 is slightly smaller than the greatest circumference of an average size hen's egg taken in a plane perpendicular to the egg's major axis. Moreover, the parts are so proportioned that when the device is slipped over an end of an egg 26 (see Figure 1), the points 6 will engage the shell's surface before further movement of the device onto the egg is interfered with by engagement of the inner ends of the arms 7 with the shell. That is to say, by slipping the opening device, point end first, over the end of an egg, all of the points 6 can be brought to bear upon the outer surface of the shell simultaneously and describing a circle around the shell somewhere near its longitudinal mid section. Consequently, by squeezing the two flanges 22 together, thus springing the arms 7 and their respective points 6 radially inwards, the points 6 can easily be caused to penetrate the shell of the egg 26, and since the points 6 are spaced only a relatively short distance about the circumference of the egg, the result is to break the shell in a relatively straight line and thus cleanly separate the shell into two substantially equal parts.

Actual use of the device has demonstrated that if the egg so operated upon by my improved opener is cooked, not only the shell but the solidified white portion of the egg's contents is similarly divided in a relatively clean plane of cleavage, thus greatly facilitating removal of the entire contents of the shell without contaminating them with particles of the shell itself. On the other hand, if a raw egg is being opened by means of the device of the present invention, the two halves of the shell serve as a convenient means of separating the yolk from the white, with one-half of the shell conveniently retained within the opening device, the flanges 22 of which are conveniently grasped between them and finger to support one-half of the egg shell while the yolk is turned back and forth from one-half to the other several times to permit the white to flow over the sides of the halves into a suitable receptacle.

Since the point carrying member 9 and the actuating band 21 therefor are retained in assembled relation merely by the inherent contractile resiliency of the band and the inherent expansive resiliency of the several arms 7, it is an easy matter to separate the two members for the purpose of cleansing, after which they again may be reassembled practically instantaneously merely by snapping the band onto the point carrying member.

I claim:

An egg opening device comprising a strip of resilient sheet material, means rigidly joining the ends of said strip in overlapping relation and thereby retaining said strip in annular form, a plurality of arms carried by said strip and extending laterally therefrom, a shell-penetrating point carried by the outer end of each of said arms, said points being arranged in a circle and being directed substantially radially inwards, and means operable while an egg is disposed within said circle for flexing said arms inward and forcing said points through the shell of said egg, said flexing means comprising a strap describing an arc slightly less than a full circle and embracing the outer ends of said arms, and spaced apart flanges extending radially outwards from the ends of said strap in position to be squeezed toward each other by thumb and finger.

JOHN MOOSS.